(12) United States Patent
Cioccheta et al.

(10) Patent No.: US 12,728,816 B2
(45) Date of Patent: Sep. 8, 2026

(54) NEAR-FIELD COMMUNICATION METHOD IMPLEMENTED WITHIN A VEHICLE

(71) Applicant: SCHAEFFLER TECHNOLOGIES AG & CO. KG, Herzogenaurach (DE)

(72) Inventors: Michele Ciocchetta, Cugnaux (FR); Yannis Escalante, Toulouse (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/157,130

(22) PCT Filed: Apr. 17, 2024

(86) PCT No.: PCT/EP2024/060331
§ 371 (c)(1),
(2) Date: Aug. 15, 2025

(87) PCT Pub. No.: WO2024/218104
PCT Pub. Date: Oct. 24, 2024

(65) Prior Publication Data

US 2026/0116340 A1 Apr. 30, 2026

(30) Foreign Application Priority Data

Apr. 20, 2023 (FR) ....................................... 2303980

(51) Int. Cl.
*B60R 25/20* (2013.01)
*B60R 25/01* (2013.01)
(Continued)

(52) U.S. Cl.
CPC ............ *B60R 25/209* (2013.01); *B60R 25/01* (2013.01); *B60R 25/245* (2013.01);
(Continued)

(58) Field of Classification Search
CPC .............. B60R 25/01; B60R 2325/103; G06K 7/10297; H04W 4/80
See application file for complete search history.

(56) References Cited

U.S. PATENT DOCUMENTS 9,887,460 B2 2/2018 Cheikh et al.
11,005,533 B2 5/2021 Chauvin et al.
(Continued)

FOREIGN PATENT DOCUMENTS

| | | | |
|---|---|---|---|
| EP | 3392843 | A1 | 10/2018 |
| EP | 3471067 | A1 | 4/2019 |
| WO | 2022128264 | A1 | 6/2022 |

OTHER PUBLICATIONS

International Search Report (PCT/ISA/210) with translation and Written Opinion (PCT/ISA/237) mailed on May 16, 2024, by the European Patent Office as the International Searching Authority for International Application No. PCT/EP2024/060331. (14 pages).
(Continued)

*Primary Examiner* — James J Lee
*Assistant Examiner* — Brandon S Lee
(74) *Attorney, Agent, or Firm* — Buchanan Ingersoll & Rooney PC

(57) ABSTRACT

A method for near-field communication implemented within a motor vehicle including steps, executed by an NFC reader, of: storing, as it is received and in a memory of the NFC reader, data pairs of portable devices located in the vicinity of the NFC reader, with each stored data pair including an application identifier corresponding to a predetermined authorized application identifier; transmitting, when the data pairs have been received, all the stored data pairs to a controller; receiving, from the controller, a request for an authentication key associated with a selected data pair; and transmitting the received authentication key to the controller
(Continued)

for controlling a function of the vehicle when the transmitted authentication key corresponds to an authorized authentication key.

12 Claims, 2 Drawing Sheets

(51) Int. Cl.
*B60R 25/24* (2013.01)
*G06K 7/10* (2006.01)
*H04W 4/80* (2018.01)

(52) U.S. Cl.
CPC .......... *G06K 7/10297* (2013.01); *H04W 4/80* (2018.02); *B60R 2325/103* (2013.01)

(56) References Cited

U.S. PATENT DOCUMENTS

2008/0017705 A1 1/2008 Costello et al.
2011/0022411 A1 1/2011 Hjelm et al.
2013/0084798 A1 4/2013 Faithorn
2019/0299930 A1 10/2019 Golsch

OTHER PUBLICATIONS

Written Opinion (PCT/ISA/237) dated Apr. 30, 2024, with machine translation, 12 pages.

NEAR-FIELD COMMUNICATION METHOD IMPLEMENTED WITHIN A VEHICLE

CROSS REFERENCE TO RELATED APPLICATIONS

This application is the U.S. National Phase Application of PCT International Application No. PCT/EP2024/060331, filed Apr. 17, 2024, which claims priority to French Patent Application No. FR2303980, filed Apr. 20, 2023, the contents of such applications being incorporated by reference herein.

TECHNICAL FIELD OF THE INVENTION

One aspect of the invention relates to a near-field communication method implemented within a motor vehicle. A particularly advantageous application of the invention is in the field of motor vehicles provided with a near-field communication device. Such a near-field communication device is also known as an NFC reader.

TECHNOLOGICAL BACKGROUND OF THE INVENTION

Near-field communication devices, called NFC readers, on board a vehicle have various applications. They are arranged, for example, in the doors or in a pillar of the vehicle and participate in the unlocking of the vehicle. To this end, they communicate with a portable device, such as a fob, a key or a mobile telephone, also equipped with near-field communication means, which is carried by the user of the vehicle. These near-field communication devices allow the portable device to be authenticated by exchanging an identifier therewith, in order to trigger the unlocking of the doors of the vehicle.

A vehicle user often carries several portable devices equipped with near-field communication means. Effectively, they may carry a vehicle key, a home and/or a business access fob and one or more payment cards.

Thus, when the user approaches their vehicle, the near-field communication device of the vehicle detects all the portable devices. When it detects several portable devices equipped with near-field communication means, it communicates with a first portable device in order to obtain a first identifier. It then transmits this identifier to control means of the vehicle, which will in turn request an authentication key associated with this identifier from the communication device. The communication device will then obtain the authentication key from the first portable device in order to then transmit it to the control means. If the authentication key obtained by the control means does not match the expected key, the near-field communication device repeats this method on each portable device until a portable device authorized to unlock the vehicle is obtained.

It should be noted that, according to this method, the time required to authenticate a portable device equipped with near-field communication means is approximately 250 milliseconds. Thus, if the user of the vehicle has several portable devices equipped with near-field communication means and the portable device authorized to unlock the vehicle doors is the last to be polled, the time required for unlocking the doors can be significant. For example, when a user has 6 portable devices, the time required to unlock the vehicle doors can be 1.5 seconds. This long period is detrimental to the user. Indeed, it is possible for the user to activate the door handle on their vehicle before it is unlocked.

SUMMARY OF THE INVENTION

The aim of the invention is to overcome the disadvantages of the prior art by proposing a near-field communication method implemented within a motor vehicle that allows the time required to control the unlocking of an opening element of the vehicle to be reduced.

In this context, an aspect of the invention thus relates, in its broadest sense, to a method for near-field communication implemented within a motor vehicle, in a near-field communication device, called NFC reader, connected to control means configured to control a function of the vehicle, the method comprising the steps, executed by the NFC reader, of:

- transmitting a presence request for detecting at least one portable device comprising a predetermined type of near-field communication means;
- receiving a presence message from each predetermined type of portable device that is present.

The method is characterized in that it comprises the following steps, executed by the NFC reader, implemented when multiple portable devices of the predetermined type are present:

- for each of the predetermined type of portable devices;
  - transmitting at least one request for collecting a data pair comprising a device identifier and an application identifier of the portable device; and
  - receiving the data pair from the portable device;
- storing, as it is received and in a memory of the NFC reader, each data pair having an application identifier corresponding to a predetermined authorized application identifier;
- transmitting, when the data pairs of each of the predetermined type of portable devices present have been received, all the received and stored data pairs to the control means;
- receiving, from the control means, a request for an authentication key associated with a data pair selected by the control means; transmitting at least one request for collecting an authentication key to the portable device associated with the selected data pair;
- receiving the authentication key; and
- transmitting the received authentication key to the control means, for comparison with at least one authorized authentication key and for controlling the function of the vehicle when the transmitted authentication key corresponds to an authorized authentication key.

The type of a portable device relates to features of the signal modulation, of the near-field communication signal transmitted and/or received by said portable device. For example, types A, B, F exist that are defined in standards, in particular the NFC Forum standard.

In other words, the on-board NFC reader in the vehicle is able to gather, in an initial phase, all the data pairs of the portable devices of the predetermined type that are present and have an application identifier similar to a predetermined authorized application identifier. Then, in a second phase, the NFC reader is able to transmit all these stored data pairs to the control means. The control means can then select, from among the received data pairs, a data pair that is likely to allow, after receiving the associated authentication key, direct or indirect control of a function of the vehicle. The function of the vehicle can be, for example, the unlocking of the vehicle doors and/or an authorization to start the vehicle.

Since the NFC reader gathers all the data pairs before transmitting them to the control means, the time required to authorize the unlocking of the vehicle doors and/or an authorization to start the vehicle is significantly reduced.

In addition to the features set forth in the previous paragraph, the method according to this aspect of the invention can have one or more additional features from among the following features, considered individually or according to all technically feasible combinations.

According to one non-limiting aspect of the invention, the step of transmitting at least one request for collecting a data pair is accompanied by sending a presence request for detecting at least one portable device comprising near-field communication means of the predetermined type.

According to one non-limiting aspect of the invention, if a data pair, received during the step of receiving a data pair from the portable device, comprises an application identifier different from the predetermined authorized application identifier, the method comprises a step of storing information relating to the irrelevance of the portable device associated with the data pair comprising an application identifier different from the predetermined authorized application identifier.

According to one non-limiting aspect of the invention, the steps of the method are executed for portable devices of a predetermined type corresponding to a first type.

According to one non-limiting aspect of the invention, if no portable device of the first type transmits the authorized authentication key, the steps of the method are repeated for portable devices of a predetermined type corresponding to a second type distinct from the first type.

According to one non-limiting aspect of the invention, if no portable device of the second type transmits the authorized authentication key, the steps of the method are repeated for portable devices of a predetermined type corresponding to a third type distinct from the first type and the second type.

According to one non-limiting aspect of the invention, the portable devices of a first type, of a second type and of a third type are selected from among portable devices comprising type A, type B and type F near-field communication means.

The type describes the modulation used by the portable device. They are defined, for example, by the NFC Forum standard.

Another aspect of the invention relates to a near-field communication device, called NFC reader, for a motor vehicle, the NFC reader being configured to communicate with control means configured to control a function of the vehicle, the NFC reader being characterized in that it comprises a memory configured to store data pairs received from portable devices comprising near-field communication means, each data pair comprising a device identifier and an application identifier of the portable device, and in that the NFC reader is configured to execute the steps of the method according to any one of the aforementioned aspects of the invention.

One aspect of the invention relates to a system for a motor vehicle, comprising a near-field communication device, called NFC reader, and control means connected to the NFC reader and configured to control a function of the vehicle, the system being characterized in that the NFC reader comprises a memory configured to store data pairs received from portable devices comprising near-field communication means, each data pair comprising a device identifier and an application identifier of the portable device, and in that the NFC reader and the control means are configured to execute the steps of the method according to any one of the aforementioned aspects of the invention.

One aspect of the invention relates to a method implemented in a system according to the invention:

- if the authentication key received by the control means corresponds to the authorized authentication key stored in the control means, the method comprises a step, executed by the control means, of controlling the function of the vehicle corresponding to the automatic opening of at least one opening element; and/or
- if the authentication key received by the control means corresponds to the authorized authentication key stored in the control means, the method comprises a step, executed by the control means, of controlling the function of the vehicle corresponding to an authorization to start the vehicle.

Another aspect of the invention relates to a motor vehicle comprising a system according to the invention.

An aspect of the invention and the various applications thereof will be better understood upon reading the following description and with reference to the accompanying figures.

BRIEF DESCRIPTION OF THE FIGURES

The figures are provided by way of a non-limiting indication of aspects of the invention.

DETAILED DESCRIPTION

Unless otherwise specified, the same element appearing in different figures has a unique reference.

Figure 1:
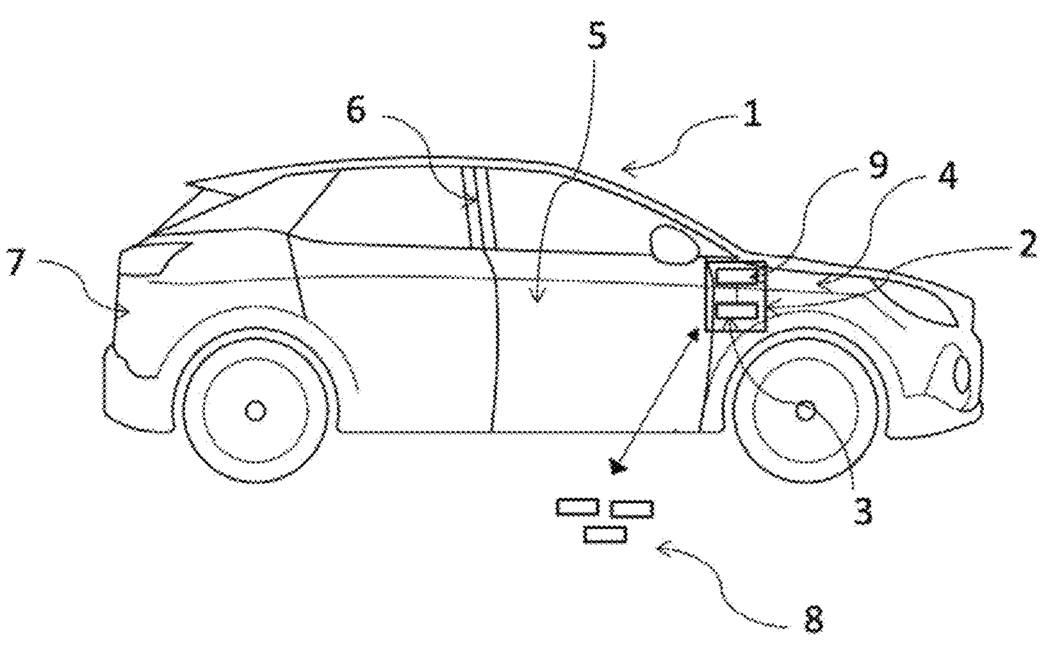
FIG. 1 schematically illustrates a vehicle according to a non-limiting aspect of the invention.

FIG. 1 schematically illustrates a motor vehicle 1 according to a non-limiting embodiment of the invention.

In this embodiment, the vehicle 1 comprises a near-field communication system 2.

The near-field communication system 2 comprises a near-field communication device 3, called NFC reader 3, disposed in a bodywork element 4 of the vehicle 1.

This bodywork element 4 is formed, in this embodiment, by a wing of the vehicle 1, but it could be formed by a door 5, a lateral intermediate pillar of the vehicle 6 or even a trunk 7 of the vehicle 1.

In a different embodiment, not illustrated, the NFC reader 3 can be disposed in the passenger compartment of the vehicle 1 and also can be associated with a wireless charger of the vehicle 1.

The NFC reader 3 is configured to communicate with portable devices 8 equipped with near-field communication means carried by a user.

The NFC reader 3 includes a memory configured to store data pairs received from portable devices 8, with each data pair including a device identifier and an application identifier of the portable device.

In this case, the near-field communication system 2 also comprises control means 9 configured to communicate with the NFC reader 3. The control means 9 are configured to control a function of the vehicle 1, for example, automatic unlocking of the doors 5 of the vehicle 1 or an authorization to start the vehicle 1.

Figure 2:
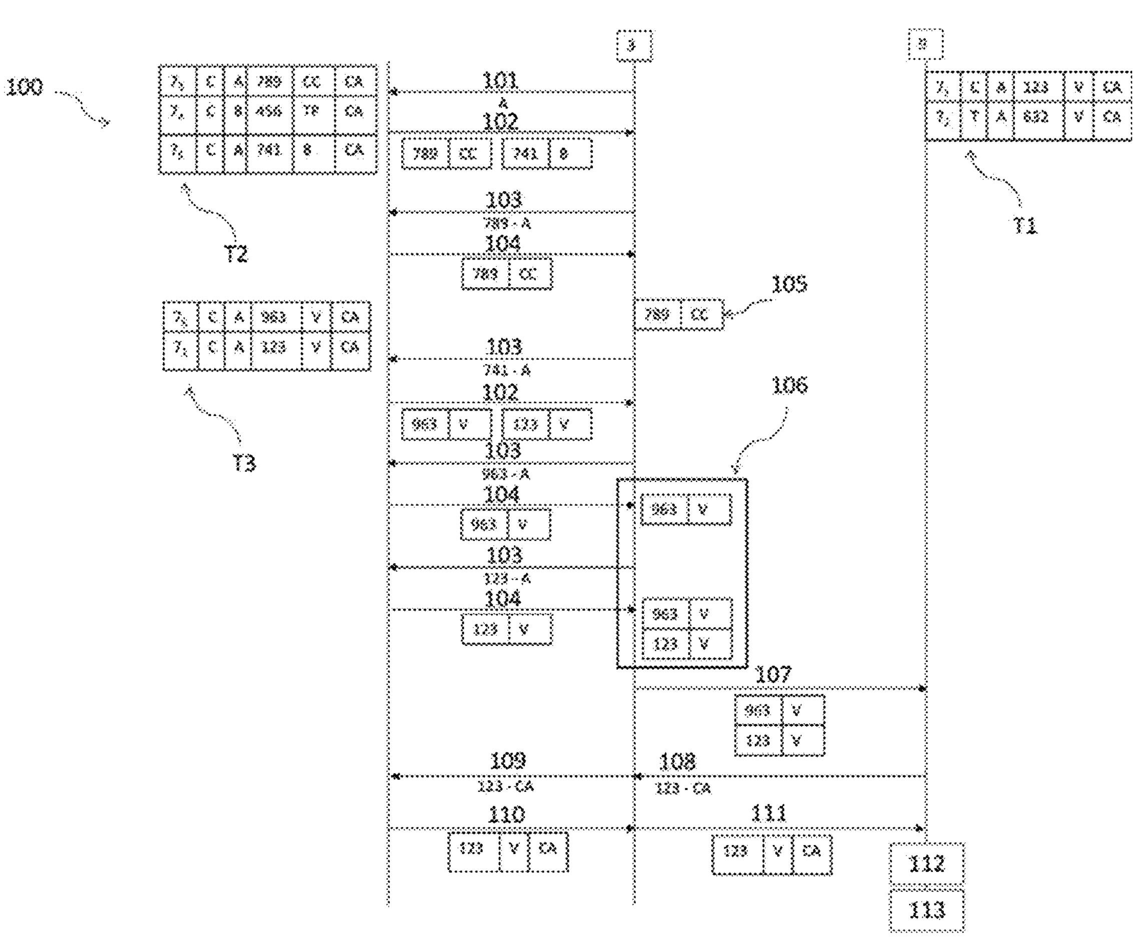
FIG. 2 schematically shows the steps of a method according to a non-limiting aspect of the invention.

The vehicle 1 is constructed and arranged to execute, by means of the near-field communication system 2, the steps of the method according to an aspect of the invention, as illustrated in FIG. 2.

The steps of the method 100 are executed for portable devices comprising near-field communication means of a predetermined type corresponding to a first type. This first type is formed, in a non-limiting embodiment, by type A. Throughout the text, and for the sake of conciseness, a portable device of a predetermined type is sometimes simply referred to, for example, as type A.

The type refers to the modulation used by the portable device. Type A is defined, for example, by the NFC Forum standard.

In this embodiment illustrated in table T1 in FIG. 2, two type A portable devices are stored in the control means 9 as devices authorized to trigger the control of the function and whose presence automatically triggers the control of the function.

More specifically, a first type A portable device $7_1$ and a second type A portable device $7_2$ are provided in the control means 9.

The first type A portable device $7_1$:

is formed by a card C;

comprises type A near-field communication means;

has a unique identifier (or UID) 123;

has a predetermined authorized application identifier (or AID) of the type of vehicle V in the example; and has an authentication key CA.

The second type A portable device $7_2$:

is formed by a telephone T;

comprises type A near-field communication means;

has a unique identifier 632;

has a predetermined authorized application identifier, namely, of the type of vehicle V; and has an authentication key CA.

If one of these first or second type A portable devices $7_1$, $7_2$ is identified by means of the method according to an aspect of the invention, then the control means 9 are able to authorize, optionally via a control unit, the control of the opening of at least one of the opening elements of the vehicle 1 or the start-up of the vehicle 1.

The method 100 comprises a first step 101, performed by the NFC reader 3, of transmitting a presence request for searching for the presence or absence of one or more portable devices comprising near-field communication means of a predetermined type, namely, type A in the example.

It should be noted that, in this embodiment, three portable devices comprising near-field communication means are located in the vicinity of the NFC reader 3.

More specifically, as illustrated in table T2, a third type A portable device $7_3$, a fourth portable device $7_4$ of a predetermined type corresponding to a second type, type B, and a fifth type A portable device $7_5$ are in the vicinity of the NFC reader 3.

The third type A portable device $7_3$:

is formed by a card C;

comprises type A near-field communication means;

has a unique identifier 789;

has a credit card CC type application identifier, with this credit card CC type application identifier being different from the predetermined authorized application identifier of the type of vehicle V; and has an authentication key CA.

The fourth type B portable device $7_4$:

is formed by a card C;

comprises type B near-field communication means;

has a unique identifier 456;

has a public transport TP type application identifier, with this public transport TP type application identifier being different from the predetermined authorized application identifier of the type of vehicle V; and has an authentication key CA.

The fifth type A portable device $7_5$:

is formed by a card C;

comprises type A near-field communication means;

has a unique identifier 741;

has a fob B type application identifier, with this fob B type application identifier being different from the predetermined authorized application identifier of the type of vehicle V; and has an authentication key CA.

The method 100 comprises a second step 102, performed by the NFC reader 3, of receiving a presence message from each portable device of the predetermined type, namely, type A, that is present. The presence message can be made up of a data pair comprising a unique identifier and an application identifier of the portable device.

A portable device is considered to be present when it is within communication range of the NFC reader 3, for example, at a maximum distance of 40 cm.

Since the third portable device $7_3$ is type A and the fifth portable device $7_5$ is type A, the NFC reader 3 receives:

from the third type A portable device $7_3$, a data pair comprising a unique identifier 789 and a credit card CC type application identifier; and from the fifth type A portable device $7_5$, a data pair comprising a unique identifier 741 and a fob B type application identifier.

As several data pairs are simultaneously received by the NFC reader 3, said reader is not able to process the information.

The method 100 then comprises an additional step 103, performed by the NFC reader 3, of transmitting at least one request for collecting a data pair, with each data pair comprising a device identifier and an application identifier. In the illustrated example, the request is initially sent to the third portable device $7_3$ (type A comprising the unique identifier 789).

In this case, but in a non-limiting manner, this request is accompanied by a request for the presence of a portable device comprising type A near-field communication means. This allows a check to be undertaken to determine whether or not the third determined portable device $7_3$ is still present, but also allows the arrival of a new type A device in the vicinity of the NFC reader 3 to be detected. In response to this presence request, the NFC reader 3 receives a presence message from each portable device comprising type A near-field communication means that are currently present. In the example illustrated herein, there has been no modification to the type A portable devices present, from the first iteration of step 102.

The method 100 then comprises an additional step 104, performed by the NFC reader 3, of receiving the data pair from the third type A portable device $7_3$. This data pair is formed, in the illustrated example, by the unique identifier 789 and the credit card CC type application identifier.

Optionally, as the application identifier of the third type A portable device $7_3$ is different from the predetermined authorized application identifier of the vehicle type (credit card CC application and vehicle V non-application), the method 100 comprises a step 105, performed by the NFC reader 3, of storing information relating to the irrelevance of the third portable device $7_3$. Thus, when the user is again in the vicinity of the vehicle, for example, the next day, provided with this third portable device $7_3$, this third portable device $7_3$ will not be detected by the NFC reader 3.

The steps of transmitting 103 at least one request for collecting a data pair and of receiving 104 the data pair from a portable device are repeated for each of the type A portable devices that are present.

Thus, the method 100 includes repeating step 103, in which a request for collecting a data pair comprising a device identifier and an application identifier is sent to the fifth portable device $7_5$ (including the unique identifier 741).

In this case again, but in a non-limiting manner, the request for collecting a data pair is accompanied by a request for the presence of a portable device comprising type A near-field communication means. This allows a check to be undertaken to determine whether or not the third determined portable device $7_5$ is still present, but also allows the arrival of a new type A device in the vicinity of the NFC reader 3 to be detected.

In this case, as illustrated in table T3, the fifth portable device $7_5$ is absent at this subsequent instant. This situation can occur when the fifth portable device $7_5$ has been moved outside the communication area covered by the NFC reader 3 so that it is no longer accessible to the NFC reader 3.

In the example illustrated in FIG. 2, two new portable devices $7_1$ and $7_6$ comprising near-field communication means (see table $T_3$, FIG. 2) are then in the vicinity of the NFC reader 3. This corresponds, for example, to the case whereby a new user approaches the motor vehicle 1.

The sixth portable device $7_6$:

is formed by a card C;

comprises type A near-field communication means;

has a unique identifier 963;

has a vehicle V type application identifier; and has an authentication key CA.

The first portable device $7_1$:

is formed by a card C;

comprises type A near-field communication means;

has a unique identifier 123;

has a vehicle V type application identifier; and has an authentication key CA.

In response to the presence request, the NFC reader 3 therefore receives a presence message from each portable device comprising type A near-field communication means present at this instant, in this case, the first and sixth devices $7_1$ and $7_6$. In this case again, the presence request is preferably formed by a data pair comprising a unique identifier and an application identifier of the portable device. The step 102, performed by the NFC reader 3, of receiving a presence message from each present portable device of the predetermined type, namely, type A, is thus repeated.

In this case again, as several presence messages are simultaneously transmitted to the NFC reader 3, said reader is not able to process the information.

As described above, the method 100 then comprises a step 103, performed by the NFC reader 3, of transmitting a request for collecting a data pair comprising a device identifier and an application identifier to each type A portable device that is present. In the illustrated example, this request is initially sent to the sixth portable device $7_6$ (comprising the unique identifier 963).

In this case again, optionally but advantageously, step 103 also comprises sending a request for the presence of a portable device comprising type A near-field communication means. In this case, there is no new change in the type A devices present in the vicinity of the NFC reader 3.

The method 100 then comprises a step 104, performed by the NFC reader 3, of receiving a data pair from the sixth portable device $7_6$. This data pair is formed, in the illustrated example, by the unique identifier 963 and the vehicle V type application identifier.

The memory of the NFC reader 3 stores information relating to at least one authorized application identifier, as also stored in the control means 109. In this case, the authorized application identifier is of the type of vehicle V. The NFC reader 3 is configured to:

extract the application identifier from the received data pair;

compare the extracted application identifier with the authorized application identifier; and the authorized application identifier, the data pair in the memory of the NFC reader 3.

In this case, the authorized application identifier is the vehicle V type. The data pair is therefore stored in the memory of the NFC reader 3. The method 100 then comprises a step 103, performed by the NFC reader 3, of sending the first portable device $7_1$ a request for collecting a data pair comprising a device identifier and an application identifier.

The method 100 then comprises a step 104, performed by the NFC reader 3, of receiving this data pair from the first portable device $7_1$. This data pair is formed, in the illustrated example, by the unique identifier 123 and the vehicle V type application identifier.

The method 100 comprises a new step 106, performed by the NFC reader 3, of storing the data pair in the memory of the NFC reader 3, if the application identifier corresponds to the authorized application identifier (see above).

When the data pairs of the first and sixth $7_1$, $7_6$ type A portable devices that are present have been received, the method 100 comprises a step 107, performed by the NFC reader 3, of sending the control means 9 all the stored data pairs, having a vehicle type application identifier corresponding to the authorized application identifier.

On the control means 9, each data pair is analyzed in order to compare the unique identifier (also called device identifier) with the unique identifier of at least one authorized device. In this case, the first device $7_1$ has the unique identifier 123, which corresponds to the unique identifier of an authorized device (see table T1, FIG. 2). The control means 9 therefore generate a request for an authentication key associated with the device with this unique identifier 123.

The method 100 then comprises the steps 108, performed by the NFC reader 3, of receiving said authentication key request from the control means 9.

The method 100 then comprises the steps, performed by the NFC reader 3, of:

sending 109 the portable device associated with said request, in this case the first portable device $7_1$, at least one request for collecting an authentication key;

receiving 110 said authentication key; and transmitting 111 said received authentication key to said control means 9 for comparison with at least one authorized authentication key, and for controlling the function of the vehicle 1 when said transmitted authentication key corresponds to an authorized authentication key.

If the authentication key received by the control means 9 corresponds to the authorized authentication key stored in the control means 9, the method 100 comprises the steps, executed by the control means 9, of:

controlling 112 the function of the vehicle corresponding to the automatic unlocking of at least one opening element 4; and/or controlling 113 the function of the vehicle corresponding to an authorization to start the vehicle 1.

If no portable device of the first type, namely, type A in this example, returns an authentication key expected by the control means 9, the steps of the method 100 are repeated for portable devices of a predetermined type corresponding to a second type, for example, type B.

Furthermore, if no portable device of the second type, namely, type B, returns an authentication key expected by the control means 9, the steps of the method 100 are repeated for portable devices of a predetermined type corresponding to a third type, for example, type F.

The various aspects of the aforementioned invention have many advantages. In particular, the invention allows a latency time to be reduced between an instant when an authorized portable device is in the vicinity of the NFC reader and an instant when the control means recognize this device as being authorized. It is thus possible to:

- reduce the time required to automatically unlock at least one opening element of the vehicle, and/or to start the vehicle; and
- prevent the user from activating a door handle while the door is still locked;
- prevent the user from attempting to start the vehicle while they are not yet authorized to do so.

The invention claimed is:

1. A method for near-field communication implemented within a motor vehicle, in a near-field communication device, called NFC reader, connected to control means configured to control a function of said vehicle, said method comprising the steps, executed by said NFC reader, of:

- transmitting a presence request for detecting at least one portable device comprising a predetermined type of near-field communication means;
- receiving a presence message from each predetermined type of portable device that is present;

said method being wherein it comprises the following steps, executed by said NFC reader, implemented when multiple portable devices of the predetermined type are present:

- for each of said predetermined type of portable devices;
  - transmitting at least one request for collecting a data pair comprising a device identifier and an application identifier of the portable device; and
  - receiving said data pair from said portable device;
- storing, as it is received and in a memory of said NFC reader, each data pair having an application identifier corresponding to a predetermined authorized application identifier;
  - transmitting, when the data pairs of each of the predetermined type of portable devices present have been received, all the received and stored data pairs to the control means;
  - receiving, from said control means, a request for an authentication key associated with a data pair selected by said control means;
  - transmitting at least one request for collecting an authentication key to the portable device associated with the selected data pair;
  - receiving said authentication key; and
  - transmitting said received authentication key to said control means, for comparison with at least one authorized authentication key and for controlling said function of the vehicle when said transmitted authentication key corresponds to an authorized authentication key.

2. The method as claimed in claim 1, wherein the step of transmitting at least one request for collecting a data pair is accompanied by sending a presence request for detecting at least one portable device comprising near-field communication means of the predetermined type.

3. The method as claimed in claim 1, wherein if a data pair, received during the step of receiving a data pair from the portable device, comprises an application identifier different from the predetermined authorized application identifier, the method comprises a step of storing information relating to the irrelevance of said portable device associated with said data pair comprising an application identifier different from the predetermined authorized application identifier.

4. The method as claimed in claim 1, wherein the steps of the method are executed for portable devices of a predetermined type corresponding to a first type.

5. The method as claimed in claim 4, wherein if no portable device of the first type transmits the authorized authentication key, the steps of the method are repeated for portable devices of a predetermined type corresponding to a second type distinct from the first type.

6. The method as claimed in claim 5, wherein if no portable device of the second type transmits the authorized authentication key, the steps of the method are repeated for portable devices of a predetermined type corresponding to a third type distinct from the first type and the second type.

7. The method as claimed in claim 4, wherein the portable devices of a first type, of a second type and of a third type are selected from among portable devices comprising type A, type B and type F near-field communication means.

8. A near-field communication device, called NFC reader, for a motor vehicle, said NFC reader being configured to communicate with control means configured to control a function of said vehicle, said NFC reader being wherein it comprises a memory configured to store data pairs received from portable devices comprising near-field communication means, each data pair comprising a device identifier and an application identifier of the portable device, and in that said NFC reader is configured to execute the steps of the method as claimed in claim 1.

9. A system for a motor vehicle, comprising a near-field communication device, called NFC reader, and control means connected to the NFC reader and configured to control a function of said vehicle, said system being wherein said NFC reader comprises a memory configured to store data pairs received from portable devices comprising near-field communication means, each data pair comprising a device identifier and an application identifier of the portable device, and in that said NFC reader and said control means are configured to execute the steps of the method as claimed in claim 1.

10. The method implemented in a system as claimed in claim 9, wherein if the authentication key received by the control means corresponds to the authorized authentication key stored in said control means, said method comprises a step, executed by said control means, of controlling the function of the vehicle corresponding to the automatic opening of at least one opening element.

11. The method implemented in a system as claimed in claim 9, wherein if the authentication key received by the control means corresponds to the authorized authentication key stored in said control means, said method comprises a step, executed by said control means, of controlling the function of the vehicle corresponding to an authorization to start said vehicle.

12. A motor vehicle, comprising a system as claimed in claim 9.

* * * * *